(12) United States Patent
Bonalle

(10) Patent No.: US 10,521,819 B2
(45) Date of Patent: Dec. 31, 2019

(54) SYSTEMS AND METHODS FOR ANALYTICS IN A COOPERATIVE DATA EXCHANGE

(71) Applicant: American Express Travel Related Services Company, Inc., New York, NY (US)

(72) Inventor: David Bonalle, New Rochelle, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 700 days.

(21) Appl. No.: 15/098,792

(22) Filed: Apr. 14, 2016

(65) Prior Publication Data
US 2016/0232566 A1 Aug. 11, 2016

(51) Int. Cl.
*G06Q 40/00* (2012.01)
*G06Q 30/02* (2012.01)

(52) U.S. Cl.
CPC ..... *G06Q 30/0255* (2013.01); *G06Q 30/0202* (2013.01); *G06Q 30/0244* (2013.01); *G06Q 30/0261* (2013.01)

(58) Field of Classification Search
CPC .......... G06Q 30/0255; G06Q 30/0261; G06Q 30/0202; G06Q 30/0244; G06Q 20/389; G06Q 20/4016; G06Q 20/405; G06Q 40/02; G06Q 40/025; G06Q 50/01
See application file for complete search history.

(56) References Cited

U.S. PATENT DOCUMENTS

| | | | |
|---|---|---|---|
| 6,714,918 B2 | 3/2004 | Hillmer | |
| 7,251,624 B1 | 7/2007 | Lee et al. | |
| 7,610,216 B1 | 10/2009 | May et al. | |
| 8,548,904 B1 | 10/2013 | Bear et al. | |
| 9,230,066 B1 | 1/2016 | Bailey | |
| 9,311,672 B2 * | 4/2016 | Hochstatter | G06Q 20/4016 |
| 9,384,493 B2 * | 7/2016 | Harris | G06Q 30/0201 |
| 2002/0002512 A1 | 1/2002 | Harpale | |
| 2002/0174000 A1 | 11/2002 | Katz et al. | |
| 2003/0097330 A1 | 5/2003 | Hillmer et al. | |

(Continued)

FOREIGN PATENT DOCUMENTS

| | | | |
|---|---|---|---|
| WO | WO-2008067543 A2 * | 6/2008 | ............ G06Q 30/02 |
| WO | 2012141910 | 10/2012 | |

OTHER PUBLICATIONS

Yi-Chun: "An Analysis of E-Commerce Opt-In/Opt-Out Policies and the Resulting Effects on Consumer Behavior", The George Washington University, May 2009 (Year: 2009).*

(Continued)

*Primary Examiner* — Edward J Baird
(74) *Attorney, Agent, or Firm* — Thomas Horstemeyer, LLP

(57) ABSTRACT

A method is provided comprising aggregating, at a first node, transactional data and a transaction identification code associated with a consumer and a transaction, and historical transactional data associated with the consumer to form a transactional profile. The method further comprises calculating, at the first node, a characteristic of the consumer based upon the transactional profile, and determining, at the first node, a business strategy for dealing with the consumer based upon the characteristic.

18 Claims, 6 Drawing Sheets

(56) References Cited

U.S. PATENT DOCUMENTS

| | | | |
|---|---|---|---|
| 2004/0073477 A1* | 4/2004 | Heyns | G06Q 10/0637 |
| | | | 705/7.31 |
| 2005/0050027 A1* | 3/2005 | Yeh | G06F 17/3087 |
| 2005/0279827 A1 | 12/2005 | Mascavage | |
| 2007/0124238 A1 | 5/2007 | Hogg et al. | |
| 2008/0195528 A1 | 8/2008 | Keithley | |
| 2008/0208760 A1 | 8/2008 | Keithley | |
| 2008/0319869 A1 | 12/2008 | Carlson | |
| 2009/0132316 A1 | 5/2009 | Florance et al. | |
| 2009/0248568 A1 | 10/2009 | Haggerty | |
| 2010/0153244 A1 | 6/2010 | Sharma | |
| 2010/0241557 A1 | 9/2010 | Galit et al. | |
| 2010/0293094 A1 | 11/2010 | Kolkowitz | |
| 2011/0040655 A1 | 2/2011 | Hendrickson | |
| 2011/0059772 A1 | 3/2011 | Want et al. | |
| 2011/0093335 A1 | 4/2011 | Fordyce et al. | |
| 2011/0112866 A1* | 5/2011 | Gerrans | G06Q 30/02 |
| | | | 705/3 |
| 2011/0131122 A1 | 6/2011 | Griffin et al. | |
| 2011/0191200 A1 | 8/2011 | Bayer | |
| 2011/0208642 A1 | 8/2011 | Shader et al. | |
| 2011/0295722 A1 | 12/2011 | Reisman | |
| 2012/0072997 A1* | 3/2012 | Carlson | G06Q 30/0254 |
| | | | 726/28 |
| 2012/0096002 A1 | 4/2012 | Sheehan et al. | |
| 2012/0109749 A1 | 5/2012 | Subramanian et al. | |
| 2012/0191577 A1 | 7/2012 | Gonsalves | |
| 2012/0316992 A1 | 12/2012 | Oborne | |
| 2012/0323954 A1* | 12/2012 | Bonalle | G06Q 30/02 |
| | | | 707/769 |
| 2013/0066679 A1* | 3/2013 | Welch | G06Q 10/04 |
| | | | 705/7.31 |
| 2013/0317886 A1* | 11/2013 | Kiran | G06Q 30/0202 |
| | | | 705/7.31 |
| 2014/0279420 A1* | 9/2014 | Okerlund | G06Q 40/00 |
| | | | 705/39 |
| 2015/0032526 A1* | 1/2015 | Calman | G06Q 30/0631 |
| | | | 705/14.25 |
| 2015/0039388 A1* | 2/2015 | Rajaraman | G06Q 30/0613 |
| | | | 705/7.29 |
| 2015/0112795 A1* | 4/2015 | Jalali | G06O 30/0249 |
| | | | 705/14.48 |
| 2016/0086190 A1* | 3/2016 | Bohrer | G06Q 30/02 |
| | | | 705/7.31 |
| 2017/0200176 A1* | 7/2017 | DeAngelo | G06Q 30/0205 |

OTHER PUBLICATIONS

USPTO; Office Action dated Mar. 5, 2013 in U.S. Appl. No. 13/160,361.

USPTO; Office Action Restriction dated Dec. 19, 2012 in U.S. Appl. No. 13/160,361.

USPTO; Notice of Allowance dated Nov. 6, 2013 in U.S. Appl. No. 13/160,361.

USPTO; Non-Final Office Action dated Dec. 13, 2013 in U.S. Appl. No. 13/571,191.

USPTO; Final Office Action dated Apr. 18, 2014 in U.S. Appl. No. 13/571,191.

USPTO; Non-Final Office Action dated Sep. 2, 2014 in U.S. Appl. No. 13/571,191.

USPTO; Final Office Action dated Mar. 6, 2015 in U.S. Appl. No. 13/571,191.

USPTO; Non-Final Office Action dated Jul. 2, 2015 in U.S. Appl. No. 13/571,191.

USPTO; Notice of Allowance dated Jan. 29, 2016 in U.S. Appl. No. 13/571,191.

USPTO; Non-Final Office Action dated Aug. 31, 2018 in U.S. Appl. No. 15/055,226.

Final Office Action dated Jan. 18, 2019 in U.S. Appl. No. 15/055,226.

Advisory Action dated Apr. 5, 2019 in U.S. Appl. No. 15/055,226.

Notice of Allowance dated Jun. 12, 2019 in U.S. Appl. No. 15/055,226.

"Senate Judiciary Subcommittee on Privacy, Technology, and the Law Hearing", Congressional Documents and publications; Washington, (Jul. 18, 2012)(Year: 2012).

* cited by examiner

SYSTEMS AND METHODS FOR ANALYTICS IN A COOPERATIVE DATA EXCHANGE

FIELD

The disclosure generally relates to financial analysis, and more particularly, to systems and methods for analytics in a cooperative data exchange context.

BACKGROUND

End consumer-facing business entities tend to have limited data relating to their customers. While a business entity may have a customer list containing demographic information about a customer and/or a set of prior transactions conducted by the business entity and the customer, many business entities may not have additional information about their customers. Moreover, it is often difficult to derive insight from this limited data set. It would thus be useful for a business entity to enhance the value of this limited data set to gain additional insights into its consumer base through, for example, a cooperative data exchange.

SUMMARY

Various systems and methods for analytics are provided herein. In various embodiments, a method is provided comprising aggregating, at a first node, transactional data associated with a consumer and a transaction, and historical transactional data associated with the consumer to form a transactional profile, wherein the first node comprises a processor for financial analysis and a tangible, non-transitory memory. The method further comprises calculating, at the first node, a characteristic of the consumer based upon the transactional profile and determining, at the first node, a business strategy for dealing with the consumer based upon the characteristic.

BRIEF DESCRIPTION OF THE DRAWINGS

The above and other features and advantages are hereinafter described in the following detailed description of exemplary embodiments to be read in conjunction with the accompanying drawing figures, wherein like reference numerals are used to identify the same or similar parts in the similar views, and.

DETAILED DESCRIPTION

Figure 1:
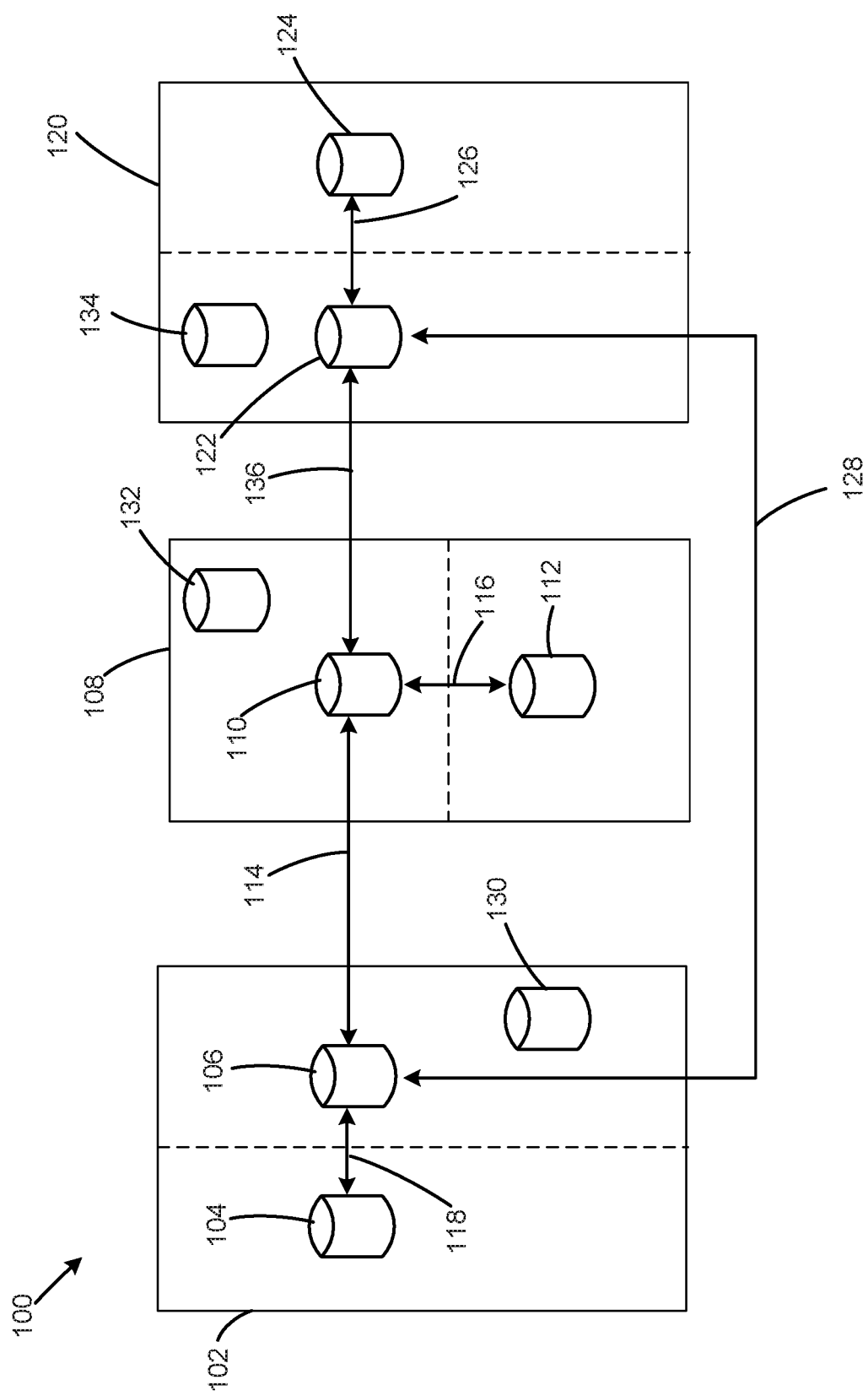
FIG. 1 illustrates a method, according to various embodiments.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Business entities (for example, merchants) may improve their businesses by harnessing data related to their customers and consumers in general. As used herein, the term "consumer" may mean any person or entity that consumes or uses an item. As used herein, a customer may mean a person or entity that has purchased and/or may purchase in the future an item from a given business entity, such as a merchant. Thus, a customer list may be a list of people or entities that have purchased or may purchase an item from another entity, such as a merchant.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account. Any portion of the methods or components discussed herein may be part of a loyalty program, wherein rewards may be provided.

In various embodiments, cooperative data exchange may be useful for businesses to gain insight into their customers and consumers in general. Cooperative data exchange may also allow businesses to view data relating to their competitors and providers of complementary goods and services. Analytics may be performed on data sets created through a cooperative data exchange to improve business performance and prospects.

Cooperative data exchanges may be used to exchange transactional data at a low level of detail. For example, transactional data, as used herein, may comprise a transaction identification code, SKU data, kind code data, and service code data related to line items in a transaction. A transaction identification code may be associated with a particular transaction, and may take numeric form, an alphabetic form, or an alphanumeric form, including a form containing one or more American Standard Code for Information Interchange ("ASCII") characters. A cooperative data exchange may be used to share transactional data with a credit issuer. The credit issuer may then use the transactional data to better understand its consumers. For more information about the use of transaction data and cooperative data exchanges, see U.S. Ser. No. 15/055,226 filed Feb. 26, 2016 and entitled "SYSTEMS AND METHODS FOR CREDIT APPROVAL USING GEOGRAPHIC DATA" and U.S. Pat. No. 9,311,672 that issued on Apr. 12, 2016 and entitled "SYSTEMS AND METHODS FOR FRAUD DETECTION USING A COOPERATIVE DATA EXCHANGE," which are hereby incorporated herein by reference in their entirety.

In various embodiments, transactional data, along with other data, may be used to calculate a characteristic of a consumer. A characteristic may any attribute that describes, approximates, predicts, or is otherwise associated with a consumer. A characteristic may be backward-looking, for example describing past behaviors or forward-looking, assigning a probability or likelihood that the consumer will engage in a behavior, event, or become a member of a given class or group. A characteristic may take various qualitative, quantitative or hybrid (combination of qualitative and quantitative) forms. A characteristic may also link a consumer to similar consumers. A characteristic may take a numeric form, an alphabetic form, or an alphanumeric form, including a form containing one or more ASCII characters. A characteristic may be the frequency, amount, and/or other qualities relating to a consumer's purchases of one or more items For example, a consumer may purchase a coffee beverage at a particular merchant regularly, such as every week day or on weekends. The consumer may purchase a similar coffee beverage while traveling for business, but not while traveling for pleasure. The association of the consumer to the coffee beverage may comprise a characteristic. Indeed, the characteristic may include the specific coffee beverage type (e.g., caramel iced coffee with skim milk), but may also include the absence or semi-frequent inclusion of other items sold at the merchant. For example, if the consumer never or almost never purchases decaffeinated coffee, that information may be represented in a characteristic. If the consumer purchases a breakfast item four times a month, that information may be represented in a characteristic.

In various embodiments, a characteristic may combine various transactional histories and demographic data pertaining to the consumer. For example, the characteristic may comprise a frequently purchased item and the proximity of the purchase location to the consumer's home, workplace, or other geographic location the consumer is often associated with, for example, the consumer's sibling or parental residences. To that end, data relating to the geographic location of a consumer, whether historic or realtime, may be used. The data relating to the geographic location of a consumer may be taken from transactional data, which in turn is derived from the cooperative data exchange and/or a credit issuer's internal data. The geographic location may also be derived from information collected from social media (whether directly or indirectly), smartphone/tablet/phablet application, or wireless carrier. Geographic information may be gathered directly from social media where social media has direct knowledge of the consumer's location. Geographic information may be gathered indirectly from social media by parsing messages, posts, photos, "checkins," or meta data related to the same for the mentioning of a specific geographic location. A consumer's social media connections may also indicate the geographic location of a consumer. A smartphone/tablet/phablet application may periodically report a consumer's location. Geographic location may be loaded into a cooperative data exchange, or obtained in another suitable data transfer manner.

Geographic locations of transactions may be overlayed on a map of a consumer's contacts. A consumer's contacts may be obtained from social media or a smartphone/tablet/phablet application. A consumer's electronic communication, such as through email, social media, text messaging, iMessaging, BlackBerry Messaging, Google Talk, etc, may be assessed for frequently contacted contacts. A consumer's contacts, including frequently contacted contacts may be mapped with a consumer's transactional data. Transactional data relating to the consumer's contacts may also be mapped and compared with the consumer. In this regard, the entire map of transactional data of the consumer and the consumer's contacts may be a characteristic. For example, it may be found that the consumer purchases food and alcoholic beverages with one or more contacts every Sunday in the fall season in one or more restaurants. Also for example, it may be found that the consumer purchases groceries on a charge card and that the geographic location of the consumer's spouse is often present in the same location, potentially indicating that both the consumer and the spouse do the grocery shopping. Moreover, as specific transactional data (e.g., SKU data for each line item purchased) may be used, a detailed profile of characteristics may be built.

A characteristic may include a group of complementary items. When aggregated, patterns of items may be identified. For example, given transactional data regarding a grocery shopping trip, a pattern of eating habits may appear. A set of potential recipes that may be made with a given collection of grocery items purchased over a period of time may be generated. For example, carrots, celery, and broth purchased at one or more stores within a three day period may indicate that a soup may be prepared. A consumer may purchase lentils, tofu, and various other legumes but not red meat or poultry, which may indicate that the consumer is a vegan, vegetarian, ovo vegetarian, lacto vegetarian, etc. The potential eating habits may also comprise a characteristic. Transactional data may also reveal other food preferences, such that purchases of sriracha sauce, chili oil, and/or hot peppers may indicate a preference for spicy food or Asian style food.

For a further example of a complementary good, a consumer who recently purchased a cable modem may be more likely to purchase a WiFi router. A consumer who recently purchased a suit may be more likely to purchase dress shoes or a dress shirt. A consumer who purchased a cell phone two years prior to a proposed transaction may be more likely to purchase a new cell phone, given that many cell phone contracts expire after two years. A consumer who purchased a Mac may be more likely to purchase an iPad, iPad Mini, iPhone, or iPod. A consumer who purchased an iPad within a month of its introduction may be more likely to purchase the latest iPad after its introduction. A consumer who purchased an Android phone may be more likely to purchase an Android tablet. A consumer may tend to purchase fine jewelry periodically (e.g., every five years) to coincide with an anniversary or birthday. The correlation between past purchases and future purchases may be referred to as the level of conformance.

In various embodiments, a characteristic may include a category of goods, such as luxury goods. Luxury good purchases may include the purchase of fine watches, fine jewelry, designer clothing, and other fine or exotic products. A consumer may spend a certain amount on one category of luxury item per year, or may spend a certain amount on several luxury items per year. For example, a consumer may purchase one fine watch a year, or several designer items of clothing per year.

In various embodiments, a characteristic may include a luxury service. Luxury services may include spa services, hair services, fine dining, and massage services. For example, a consumer may purchase a spa service once a year at a resort, or may spa services at a local spa.

In various embodiments, a characteristic may include luxury travel. Luxury travel includes flying business or first class, staying at fine hotels and resorts, and purchasing luxury ground transportation.

A characteristic may be used to determine a business strategy. A business strategy may be any business decision to pursue, maintain, or discontinue a business relationship with a consumer. For example, a business strategy may comprise targeted solicitation of a consumer. The solicitation may be made in any suitable manner such as by email, text message, smartphone/tablet/phablet application notification, regular mail, or phone call. The solicitation may be based upon a characteristic.

One or more associations with a characteristic may be made regarding a consumer, and the associations used to determine a business strategy. For example, frequent purchasers of luxury items may be targeted by luxury merchants. Moreover, luxury merchants may specifically target the consumer relating to a frequently purchased item or item category. Indeed, a luxury merchant may attempt to win business from another luxury merchant by knowing the precise items a consumer buys from the other luxury merchant and what times of the year. In that regard, the luxury merchant may solicit the consumer to buy a fine watch when the consumer has a characteristic of purchasing a fine watch every December, or every other December. The luxury merchant may offer a discounted price, or offer more sophisticated services than the merchant the consumer normally frequents.

Associations may also be made regarding consumer lifestyle. As mentioned above, a consumer's diet may be assessed based upon grocery and dining purchases. A consumer may have a characteristic of being a vegan. Thus, a business strategy built around that fact would be helpful in reaching the consumer and selling additional or complementary products that fit a vegan lifestyle. Indeed, the use of transaction data (e.g., SKU data) may refine the characteristic as ovo vegetarian as opposed to vegan, or a characteristic of not eating pork products or of not eating dairy and meat in the same meal. The kinds of food a consumer consumes regularly may also provide insight into health status, which may be further refined by linking food purchased with medications purchased. For example, a merchant of medicines or other devices that cater to those with chronic illnesses may be able to target those with poor eating habits.

In various embodiments, a business strategy may comprise an "upsell." An upsell may comprise influencing the consumer to purchase a more expensive product or service that the consumer had originally contemplated. For example, a consumer that purchases a large coffee everyday may be sent ad impressions suggesting that an extra-large coffee would be more desirable. A consumer that purchases "entry level" luxury items may be sent ad impressions that encourage the consumer to purchase higher levels of luxury goods or additional entry level luxury items. For a consumer that purchases emergency plumbing services, ad impressions that encourage the purchase of higher quality plumbing fixtures (e.g., toilet, hot water heater, etc) may be sent.

In various embodiments, data normalization may be performed. Data normalization may include the adjustment of a characteristic over a period of time or a number of transactions to exclude outliers. For example, a consumer may go through periods of large spending, such as when a child is born, goes to college, or gets married. These "life event" purchases may not be probative of regular behavior and may not be probative of the consumer. For example, a consumer may purchase a green dress for her daughter's wedding because it represents the daughter's tastes and not necessarily that of the consumer. Thus, the behavior may be excluded as a characteristic. Moreover, a consumer may "splurge" over a given period of time, purchasing an item that is more expensive than the consumer would buy otherwise. The "splurge" may also be on an item meant as a gift. Such data points may be excluded in data normalization. Data normalization thus acts to focus the transactional data in a more useful way.

Cooperative data exchange 100 is illustrated in FIG. 1. A cooperative data exchange may comprise multiple nodes. For example, a cooperative data exchange may comprise a first node, second node, third node, fourth node, etc. A node may be any system that may comprise a data store and, in various embodiments, also comprise a processor and/or a memory. A node may comprise, for example, a computer system, smart phone, or tablet computing device, as described herein. A node may also be connected to any network, including those described herein. For example, a node may be connected to the Internet, such as directly or through an intranet. A node may also be connected to a virtual private network, including the types described herein.

With continuing reference to FIG. 1, in various embodiments, node 102 communicates through secure channel 114 with node 108. Node 108 communicates through secure channel 136 with node 120. Node 120 communicates with node 102 through secure channel 128. As used herein, the phrase secure channel is used interchangeably with the phrase secure connection, and may include fully secure, substantially secure or partially secure.

Node 102 may comprise private facing data store 104 and public facing data store 106. Private facing data store 104 may not connect to or otherwise access or be accessed directly by other nodes on cooperative data exchange 100. However, public facing data store 106 may connect directly to public facing data stores of one or more other nodes on cooperative data exchange 100. Connection 118 facilitates communication between private facing data store 104 and public facing data store 106.

Node 102 may also comprise lookup module 130. Lookup module 130 may comprise a lookup table. The lookup table may comprise addresses of other nodes on cooperative data exchange 100. For example, the lookup table may comprise IP addresses, domain names, port information, and other protocol information (e.g., security protocol information) relating to other nodes on cooperative data exchange 100. In this manner, the lookup table may be used identify where and how to establish communication from node 102 to another node on cooperative data exchange 100. For example, the lookup table may comprise an entry for node 120 that exists at IP address 12.34.567.89, communicates on port 587, and requires a TLS connection. In the event node 102 would like to connect to a desired node that is not present on lookup module 130, node 102 may connect with another known node and request (i.e., query) the lookup module of the known node for the address of the desired node. If the known node does not have the requested information, node 102 may query other known nodes, either simultaneously or sequentially, to determine the desired node's address. For example, if node 102 would like to connect to node 120 and does not know the correct port number, node 102 may query the lookup module of node 108 to determine the appropriate port. Node 102 may continue to access the lookup module for each node contained in lookup module 130.

Figure 4:
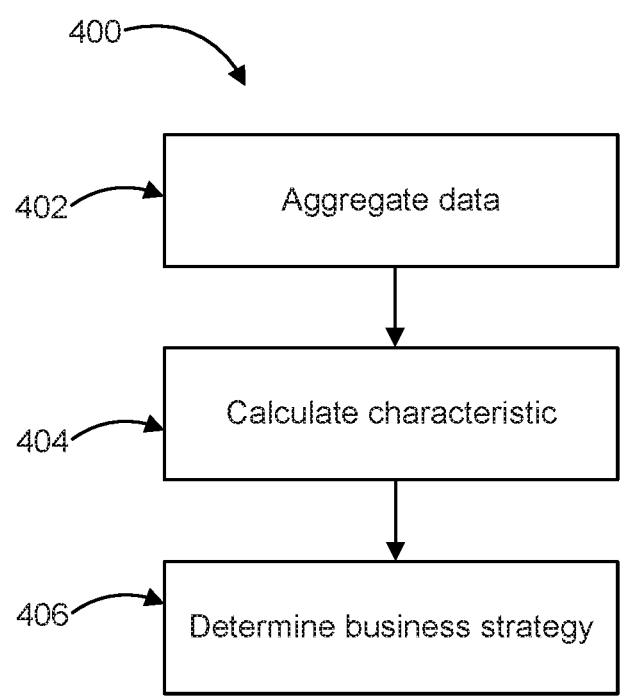
FIG. 4 illustrates a method, according to various embodiments.

With momentary reference to FIG. 4, lookup methodology 400 according to various embodiments is shown. A node may look up other nodes in its own lookup module at lookup members 402. At decision point 404, if there is a match between the desired node and the lookup table of the node's lookup module, then locate members 408 is performed. Locate members 408 may include resolving a domain name with a domain name system and/or establishing a secure channel with the desired node. A secure channel may be any encrypted channel or connection, such as, for example, via virtual private network, tunneling protocol (e.g., ssh tunnel), SSL, TLS, or the like, as further described herein. If there is no match between the desired node and the lookup table of the node's lookup module at decision point 404, then lookup members 406 is performed. Lookup members 406 may comprise querying the lookup modules of other, known nodes to find the desired node.

Referring back to FIG. 1, node 108 may comprise private facing data store 112 and public facing data store 110. Private facing data store 112 may not connect to or otherwise access or be accessed directly by other nodes on cooperative data exchange 100. However, public facing data store 110 may connect directly to public facing data stores of one or more other nodes on cooperative data exchange 100. Connection 116 facilitates communication between private facing data store 112 and public facing data store 110.

Node 120 may comprise private facing data store 124 and public facing data store 122. Private facing data store 124 may not connect to or otherwise access or be accessed directly by other nodes on cooperative data exchange 100. However, public facing data store 122 may connect directly to public facing data stores of one or more other nodes on cooperative data exchange 100. Connection 126 facilitates communication between private facing data store 124 and public facing data store 122.

Node 102 may initiate and/or use secure channel 114 to communicate with public facing data store 110 of node 108. In like manner, node 102 may initiate and/or use secure channel 128 to communicate with public facing data store 122 of node 120.

Cooperative data exchanges may be used to share and analyze business information. Merchants may keep customer lists. Customer lists may be populated with customers who "opt-in" to merchant frequent buyer programs (e.g., frequent flyer programs and in-store coupon programs) and/or customers who join a membership-driven merchant (e.g., a warehouse "club"). Moreover, customer lists may be populated with transactional data not tied to an individual's name or other identifying information. Thus, a customer list may contain a customer name, a transaction history (including stock keeping units "SKUs" purchased), and/or customer contact information. Any individual customer on a customer list may be referred to as a first customer or a reference customer.

For merchants who do not keep customer lists, but retain transactional data, a merchant may possess data relating to a particular transaction (e.g., time, date, amount purchased, geographic location, etc). Such data is still considered to be related to a reference customer, even though the reference customer's name is not known.

Customer lists, merchant transactional data and the like, standing alone, have a limited ability to provide a merchant with insight into its customers and consumers generally. Thus, merchants and other businesses may find it advantageous to create a node on a cooperative data exchange, obtain shared data from other nodes, join or merge the shared data with their own data and perform analytics on such data.

In various embodiments, a node may comprise a private data store and/or a public data store that may comprise internal data. "Internal data" and terms similar to "internal data" may include any data a credit issuer possesses or acquires pertaining to a particular consumer or group of consumers. Internal data may be gathered from a transaction system, such as a closed loop transaction system. Internal data may be gathered before, during, or after a relationship between the credit issuer and the transaction account holder (e.g., the consumer or buyer). Such data may include consumer demographic data. Consumer demographic data may include any data pertaining to a consumer. Consumer demographic data may include consumer name, gender, age, address (including ZIP code and 4 digit extension, also known as "ZIP+4"), telephone number, email address, employer and social security number. Consumer transactional data may include any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

In various embodiments, as discussed above, a node may contain internal data in a private facing data store, a public facing data store, or a combination thereof. In various embodiments, a node may contain internal data in a private facing data store and then a subset of the internal data in a public facing data store. For example, the internal data in a public facing data store may not contain personally identifiable information, or it may contain a summary of internal data found in the private facing data store, or it may contain data derived from internal data, such as size of wallet or share of wallet information. A size of wallet may comprise a measure of the amount a consumer spends using a credit, debit, and/or charge card. A share of wallet may comprise a measure of the relative share of a consumer's size of wallet that is spent in one industry or one merchant. A secure connection, such as secure channel 114, may be used to extract internal data from private facing data store into public facing data store.

Internal data placed in the public facing data store may be indexed or otherwise processed to preserve the underlying internal data as provide while still communicating valuable insight into a given consumer, consumer group, business, or industry. Such internal data may be referred to as processed internal data.

The internal data may be indexed, for example when stored in a public facing data store. For example, an index of data derived from internal data may comprise a measurement that relates the data to another data set. For example, the national average size of wallet of a consumer may be set arbitrarily at 100. A particular consumer may have an average size of wallet twice that of the national average and, thus, could have an indexed value of 200. In this manner, the indexed value could be placed in a public facing data store, so nodes that request this information do not receive the underlying data, but an indexed value as measured against a large pool of other consumers. Indexing may be useful in that is provides concrete trend information yet preserves specific aggregate data. In various embodiments, a large collection of internal data may exist on a node.

Internal data may also be processed to reflect the underlying data. For example, the internal data may comprise a metric that represents spend in various ranges over a given time period, such as the last quarter or year. As an example, a score of 5000 may indicate that ac consumer spent between $5000 and $6000 in the given time period. The internal data may include a range of numbers or a numeric indicator that indicates the trend of a consumer's spend over a given time period. For example, a trend score of +4 may indicate that the consumer has increased spending over the previous 4 months, while a trend score of −4 may indicate that the consumer has decreased spend over the previous 4 months. Further, aggregate data may be derived from the internal data relating to the purchasing of a population of transaction account users within a given industry.

In various embodiments, a node may comprise an analytics module or may be in communication with an analytics module. An analytics module may be any device, software, or combination thereof that is configured to perform analytics. Analytics may comprise one or more statistical analyses or other manipulation of data. The output of the analytics module may provide insight into consumer behaviors and may be used in a variety of contexts, as described herein.

Figure 2:
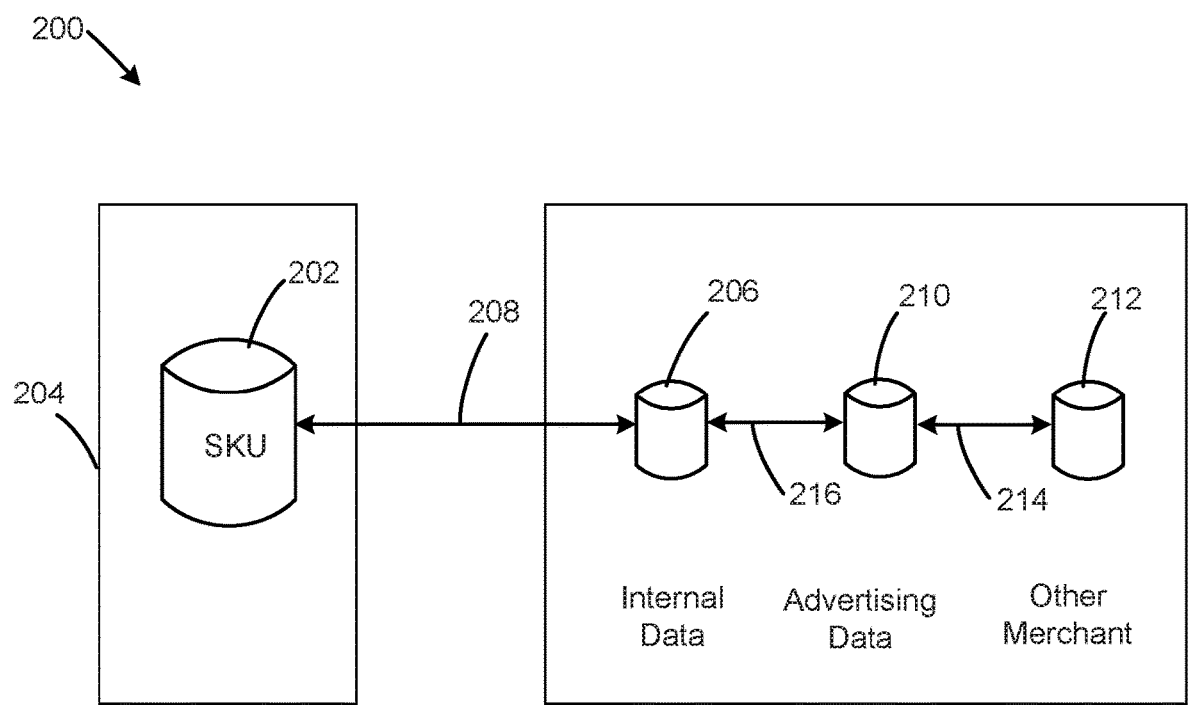
FIG. 2 illustrates a method including a select strategy, according to various embodiments.

With reference to FIG. 2, portion of a cooperative data exchange 200 is shown. Node 204 may comprise a public facing data store 202 that houses transactional information from a first merchant, which may include transaction date, transaction time, transaction amount, SKUs/kind codes/ service codes in a given transaction, customer name, customer address (including ZIP+4), customer age, and customer gender. Node 204 uses secure channel 208 to connect from the public facing data stores of other various nodes, such as data stores 206, 210 and 212. Data store 206 may comprise internal data. Data store 210 may comprise advertising data that may comprise data relating to present and historical advertising campaigns and customers who took an action in response to such advertising campaigns. Data store 212 may comprise transactional information from a second merchant, which may include transaction date, transaction time, transaction amount, SKUs in a given transaction, customer name, customer address (including ZIP+4), customer age, customer gender, and or data derived from the same.

Public facing data store may further comprise customers who have purchased a specific product, customers identified as reaching a certain level in a sales cycle, customers who have made purchases through a particular sales channel, customers who have responded to marketing campaigns based on specific offer types, product bundling/product types, specific seasons, marketing creative and specific advertising/marketing channels, customers who are defined as high value through purchase amount (i.e., historical transactional amount), customer geographic information (including instantaneous geographic information obtained from a digital device such as a GPS-equipped smartphone and historical instantaneous geographic information obtained from similar sources) customer preference for a particular merchant or type of merchant, customer media preference or psychographic information (e.g., customer preference of NPR over Fox News), customers defined by the sequence of products that a consumer purchases (e.g., TV, computer, printer, ink), customer response to surveys, customer data collected by third parties (including credit bureaus), customers satisfied with a particular product or brand, customers who attrite, customers who make an insurance claim, customers who have been identified as providing a particular level of return on investment or return to a merchant based on marketing initiatives or purchase history, customers who have viewed a merchant's social network page, ad, and/or feed (e.g., a Facebook, MySpace, and/or LinkedIn page and/or a Twitter or RSS feed), other social network ad, television ad, customer's viewing of an advertising channel which lead to a sale or other action, customers who have a high or low opinion of a particular merchant's brand(s), or any other event or data point that may allow matching or joining with internal data.

Node 204 may supplement received data from data stores 206, 210 and 212 with third party data sources. For example, a third party data source may provide customer credit scores, social network histories (which include any information a social network may gather regarding a consumer, for example, posted messages, approximate age and gender of spouse, children and other members of household, pictures, past consumer geographic locations, patterns of past consumer geographic locations, propensity to engage in risky behaviors and the frequency of engaging in the same, marital status, substance use history, dating history, education level, present and past health status including disease status), public records, consumer transactions conducted using alternate payment systems, consumer health status, and any other data relating to consumers who may appear in the internal data. Data from third party data sources may be joined or appended to internal data relating to consumers. For example, if the internal data contains a record for consumer "A" and a third party data source has a history of A's postings on one of A's social network pages, all or a portion of the third party's data may join A's internal data.

Node 204 may then join or otherwise merge the received data from data stores 206, 210 and 212. Performing a join, for example, may be accomplished using any join function known in the art, as described herein. For example, a join may be performed to match records from one data set to another. For example, transaction date, transaction time, and transaction amount from data store 202 may be joined with transaction date, transaction time, and transaction amount from data store 206. The join may then return internal data related to the customer who engaged in the transaction in question. The join may utilize a range of data depending upon the desired results, and the join query may account for differences in time stamps across various systems. For example, if a join fails to return any results, the transaction time may be altered slightly in the event the internal data is a few seconds or minutes different from the first merchant data. As an example, for first merchant data in table first_merchant and internal data in table internal_data, the following query may be used to obtain a customer size of wallet for a customer who engaged in a transaction with the first merchant: SELECT customer_size_wallet, customer_household_income FROM internal_data WHERE first_merchant.transaction_time=internal_data.transaction_time AND first_merchant.transaction_amount=internal_data.transaction_amount AND first_merchant.transaction_date=internal_data.transaction_date. In many cases, only one record will be returned, provided that the first_merchant had one transaction for a given transaction time, date and amount. If multiple records are returned, other queries may be used to further match records, for example, by inserting transaction location.

Other data may be derived from the received data. For example, a consumer's social networking history may be queried for mentions of luxury brand names, and photo recognition software may be used to scan the consumer's posted social networking photos for the same. Consumers with high or low frequencies of occurrence may be isolated for further analytics. Photo recognition software may be used to scan the consumer's posted social networking photos for the gender and age of the consumer's spouse and children. Also for example, a consumer's social networking history may be queried for mentions of health status and/or disease state. These data, in combination with any internal data, may be useful in marketing medical and/or lifestyle products suited to that health status and/or disease state.

Figure 3:
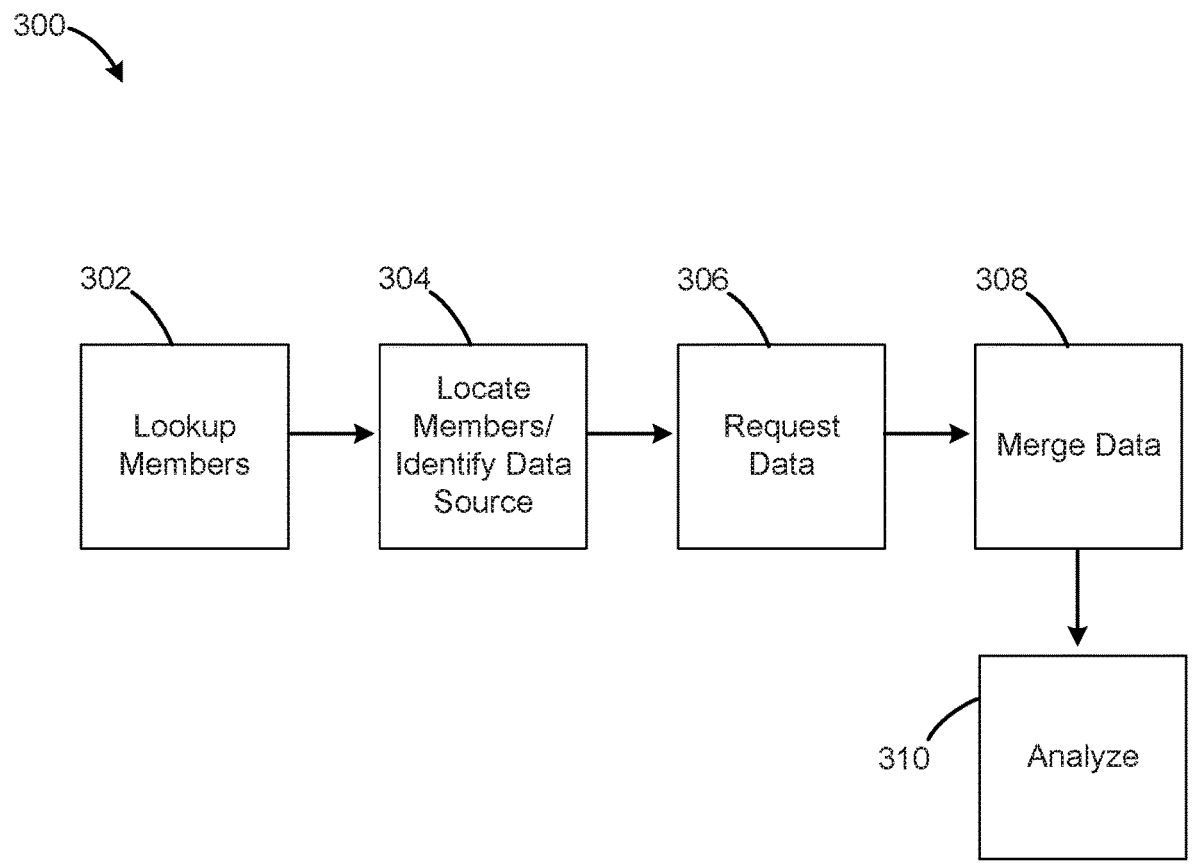
FIG. 3 illustrates a system, according to various embodiments.

With reference to FIG. 3, method of using a cooperative data exchange 300 is illustrated. A node looks up other nodes to access lookup members 302. The node then locates other nodes and selects which public facing data store from which to request data to locate members/identify data source 304. The node then requests data from the desired public facing data store(s) in request data 306. The node may then receive received data from the desired public facing data store(s). The node may process the received data, such as performing a merge or join on the received data to form a final data set. The final data set may then be analyzed in analyze 310. Any analytical process may be performed on the final data set.

With reference to FIG. 4, method 400 is illustrated. In step 402, data is aggregated, for example, at a first node. The data aggregated may be obtained from other nodes or from alternate data sources. The data aggregated may comprise transactional data, internal data, and data from other sources such as social media history, demographic data, and any other data relating to a consumer. In step 404, a characteristic is calculated for a consumer. For example, transactional data and internal data may be used to calculate a characteristic, such as in the examples given herein. In step 406, a business strategy may be determined based upon the characteristic calculated in step 404.

Figure 5:
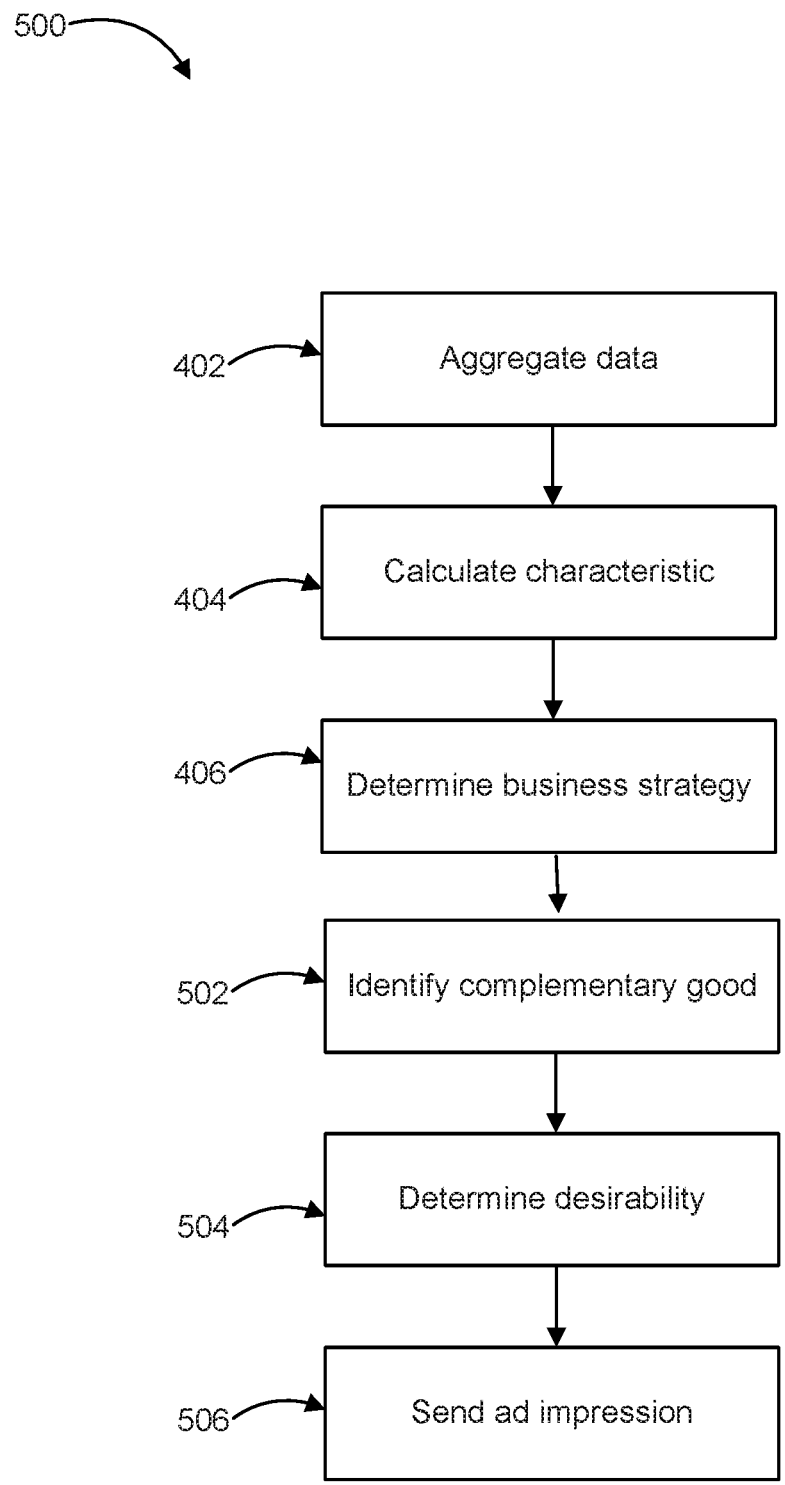
FIG. 5 illustrates an additional method, according to various embodiments.

With reference to FIG. 5, method 500 is illustrated. Method 500 comprises the steps found in method 400. In step 502 a good is identified that is complementary to a good contained in the aggregated data of step 402. In step 504, the desirability of the complementary good to the consumer is determined. A database of complementary goods may be kept and accessed to make sure determination.

In step 506, an ad impression is sent to the consumer relating to the complementary good. The ad impression may be sent electronically, via email or smartphone/tablet/phablet application, via text message, via phone, and/or via paper media.

Figure 6:
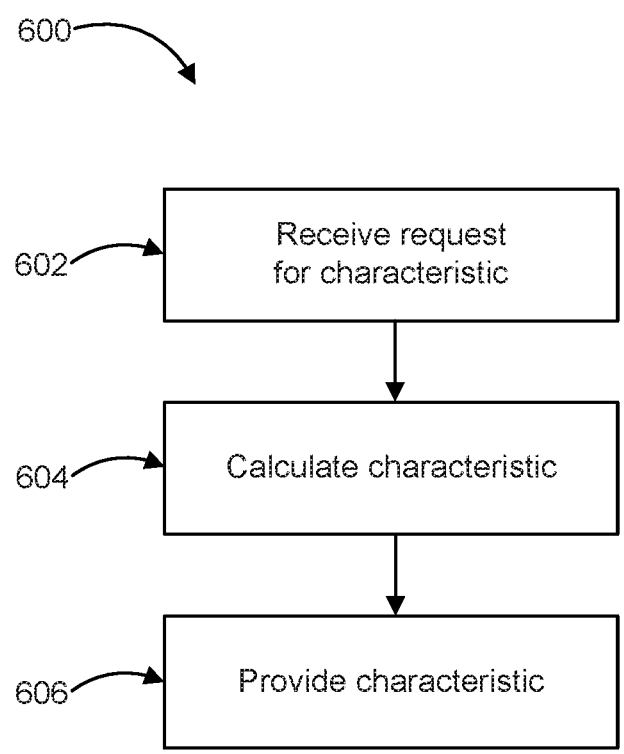
FIG. 6 illustrates a further method, according to various embodiments.

With reference to FIG. 6, method 600 is illustrated. In step 602, a request for a characteristic is received. For example, a merchant may make a request to, for example, a first node, for a characteristic. The request may be formed in any suitable format, including natural language, a structured query, or another format that conveys such a request. In step 604, the characteristic is calculated. In step 606, the characteristic is provided (e.g., transmitted) to the requestor (e.g., a merchant). In that regard, the merchant may receive the characteristic and determine a business strategy.

The cooperative data exchange may thus be used to produce a final data set upon which analytics may be performed to produce analyzed data. The analytics performed may be used in any business or market segment that sells goods, services, or extends credit or otherwise evaluates the creditworthiness of a particular consumer. In various embodiments, businesses will be referred to herein as falling into one of three categories: financial services companies, retail companies, and other companies.

In various embodiments, transactional data relating to a consumer from a merchant may be received by a credit issuer. The credit issuer may build a profile of the consumer comprising transactional data. As discussed above, transactional data may comprise SKU data, kind code data and service code data, so individual line items purchased by a consumer may be analyzed by the credit issuer. In various embodiments, transactional data may be combined with internal data, which as discussed above contains data relating to the time, place, and other circumstances of a consumer's transactions. Accordingly, the type of products, the merchants frequented, and the time and place of a consumer's transactions may be modeled.

The business cycle in each category may be divided into three phases: acquisition, retention, and disposal. The acquisition phase occurs when a business is attempting to gain new consumers. The acquisition phase includes, for example, targeted marketing, determining what items to offer a consumer, deciding whether to lend to a particular consumer and what the line size or loan should be, and deciding whether to buy a particular loan. The retention phase occurs after a consumer is already associated with the business. In the retention phase, the business interests shift to managing the consumer relationship through, for example, consideration of risk, determination of credit lines, cross-sell opportunities, increasing business from that consumer, and increasing the company's assets under management.

The disposal phase is entered when a business wishes to dissociate itself from a consumer or otherwise end the consumer relationship. The disposal phase can occur, for example, through settlement offers, collections, and sale of defaulted or near-default loans.

Financial services companies include, for example: banks and other lenders, mutual fund companies, financiers of leases and sales, life insurance companies, online brokerages, credit issuers, and loan buyers.

Banks and lenders can utilize the analyzed data in all phases of the business cycle. One exemplary use is in relation to home equity loans and the rating given to a particular bond issue in the capital market. Analyzed data may be useful in issuing home equity lines of credit and automobile loans in a similar manner.

For example, if the holder of a home equity loan borrows from the capital market, the loan holder issues asset-backed securities ("ABS"), or bonds, which are backed by receivables. The loan holder is thus an ABS issuer. The ABS issuer applies for an ABS rating, which is assigned based on the credit quality of the underlying receivables. One of skill in the art will recognize that the ABS issuer may apply for the ABS rating through any application means without altering the spirit and scope of the present invention. In assigning a rating, the rating agencies weigh a loan's probability of default by considering the lender's underwriting and portfolio management processes. Lenders generally secure higher ratings by credit enhancement. Examples of credit enhancement include over-collateralization, buying insurance (such as wrap insurance), and structuring ABS (through, for example, senior/subordinate bond structures, sequential pay vs. pari passu, etc.) to achieve higher ratings. Lenders and rating agencies may use certain characteristics the debtors of the underlying debt obligations into consideration when determining the appropriate level of credit enhancement. Thus, lenders and rating agencies, among others, may join a cooperative data exchange to obtain and/or join data from other sources with their own, for example, to assist in determining the appropriate level of credit enhancement.

During the acquisition phase of a loan, lenders may join a cooperative data exchange to obtain and/or join data from other sources with their own to improve their lending decisions. Before issuing the loan, lenders can obtain data relating to a given potential debtor and use the data to make credit extension evaluations. For example, a lender may join its own data with internal data from a transaction system and determine a potential debtor's size of wallet or a potential debtor's propensity to purchase goods or services associated with those who have poor credit histories. Evaluation leads to fewer bad loans and a reduced probability of default for loans in the lender's portfolio. For a given loan portfolio that has been originated using data analyzed from a cooperative data exchange in accordance with various embodiments, either a higher rating can be obtained with the same degree of over-collateralization, or the degree of over-collateralization can be reduced for a given debt rating. Thus, using data analyzed from a cooperative data exchange at the acquisition stage of the loan reduces the lender's overall borrowing cost and loan loss reserves.

During the retention phase of a loan, data analyzed from a cooperative data exchange can be used to track a consumer. Based on the trends observed, the lender can make various decisions regarding the consumer relationship.

The gaming industry can use data analyzed from a cooperative data exchange, for example, during the acquisition and retention phases of the business cycle. Casinos often extend credit to their wealthiest and/or most active players, also known as "high rollers." The casinos can use data analyzed from a cooperative data exchange to gain better insight into these consumer and adjust their accommodations to better fit their customer's needs. For example, casinos can gain insight into a customer's accommodation preferences or food preferences.

Communications providers, such as telephone service providers, often contract into service plans with their consumers. In addition to improving their targeted marketing strategies, communications providers can use data analyzed from a cooperative data exchange during the acquisition and retention phases to better market new phones and phone services. For example, a telephone service provider may target advertising to those consumers whose cellular phone contracts are about to expire.

Members of the travel industry can make use of data analyzed from a cooperative data exchange in the acquisition and retention stages of the business cycle. For example, a hotelier typically has a brand of hotel that is associated with a particular "star-level" or class of hotel. In order to capture various market segments, hoteliers may be associated with several hotel brands that are of different classes. During the acquisition phase of the business cycle, a hotelier may use the data analyzed from a cooperative data exchange to better target individuals that have appropriate spend capacities for various classes of hotels. During the retention phase, the hotelier may use the data analyzed from a cooperative data exchange to determine, for example, when a particular individual may be associated with increased spending overall or increased spending in a given industry, such as the travel industry. Based on that determination, the hotelier can market a higher class of hotel to the consumer in an attempt to convince the consumer to upgrade.

One of skill in the relevant art(s) will recognize that many of the above described applications of one or more consumer data cohort attributes may be utilized by other industries and market segments without departing from the spirit and scope of the present invention. For example, the strategy of using one or more consumer data cohort attributes to model an industry's "best consumer" and targeting individuals sharing characteristics of that best consumer can be applied to nearly all industries.

In various embodiments, the system and method may include alerting a subscriber when their computer is offline. The system may include generating customized information (e.g., via the cooperative data exchange) and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information (e.g., about the cooperative data exchange) of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., in the cooperative data exchange) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions (e.g., based on information in the cooperative data exchange), using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and/or a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the account or external to but affiliated with account. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the account, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or account. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical web site might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2-5 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
receiving, by a computer-based system, a first transaction identifier associated with a first transaction of a consumer, wherein the first transaction is at a first merchant;
providing, by the computer-based system and to the first merchant, the first transaction identifier;
receiving, by the computer-based system and from the first merchant, first stock keeping unit (SKU) data associated with the first transaction identifier;

matching, by the computer-based system, the first SKU data to corresponding first transactional data associated with the first transaction;

receiving, by the computer-based system, a second transaction identifier associated with a second transaction of the consumer, wherein the second transaction is at a second merchant;

providing, by the computer-based system and to the second merchant, the second transaction identifier;

receiving, by the computer-based system and from the second merchant, second SKU data associated with the second transaction identifier;

matching, by the computer-based system, the second SKU data to corresponding second transactional data associated with the second transaction;

aggregating, by the computer-based system, the first transactional data and the second transactional data associated with the consumer to form aggregated transactional data comprising the first SKU data, the first transactional data, the second SKU data, and the second transactional data;

confirming, by the computer-based system, that a node is associated with the consumer, in response to the node matching a lookup table in a lookup module for the node;

aggregating, by the computer-based system, historical transactional data from the node associated with the consumer to form aggregated historical transactional data;

forming, by the computer-based system, a transactional profile based on the aggregated transactional data and the aggregated historical transactional data;

calculating, by the computer-based system, a characteristic of the consumer based upon the transactional profile;

determining, by the computer-based system, a pattern of habits of the consumer based upon the transaction profile;

determining, by the computer-based system, a targeted solicitation for a complementary good at the first merchant for the consumer based upon the pattern and the characteristic, wherein the complementary good at the first merchant complements a product associated with the second SKU data from the second merchant, and wherein the targeted solicitation is viewable by the consumer on a graphical user interface, in response to obscured textual information on the graphical user interface being dynamically relocated and rescaled;

receiving, by the computer-based system, the targeted solicitation sent to the consumer; and determining, by the computer-based system, that the targeted solicitation is described in the aggregated transactional data.

2. The method of claim 1, wherein the aggregated transactional data also comprises at least one of kind code data or service code data.

3. The method of claim 1, wherein the first merchant and the second merchant are not affiliated with each other.

4. The method of claim 1, wherein the calculating comprises
determining whether the complementary good may be desired by the consumer.

5. The method of claim 1, wherein the calculating comprises identifying a competitive good relative to the aggregated transactional data.

6. The method of claim 1, further comprising sending, by the computer-based system, the targeted solicitation for the complementary good to the consumer.

7. The method of claim 1, further comprising identifying that a good described in the aggregated transactional data is an upsell good.

8. The method of claim 1, wherein the targeted solicitation sent to the consumer contains an upsell.

9. The method of claim 1, further comprising creating, by the computer-based system, an association between a transaction location for the first transaction and a category of good purchased.

10. A system comprising:
a processor; and
a non-transitory memory communicating with the processor, the non-transitory memory having instructions stored thereon that, in response to execution by the processor, cause the processor to perform operations comprising:
receiving, by the processor, a first transaction identifier associated with a first transaction of a consumer, wherein the first transaction is at a first merchant;
providing, by the processor and to the first merchant, the first transaction identifier;
receiving, by the processor and from the first merchant, first stock keeping unit (SKU) data associated with the first transaction identifier;
matching, by the processor, the first SKU data to corresponding first transactional data associated with the first transaction;
receiving, by the processor, a second transaction identifier associated with a second transaction of the consumer, wherein the second transaction is at a second merchant;
providing, by the processor and to the second merchant, the second transaction identifier;
receiving, by the processor and from the second merchant, second SKU data associated with the second transaction identifier;
matching, by the processor, the second SKU data to corresponding second transactional data associated with the second transaction;
aggregating, by the processor, the first transactional data and the second transactional data associated with the consumer to form aggregated transactional data comprising the first SKU data, the first transactional data, the second SKU data, and the second transactional data;
confirming, by the processor, that a node is associated with the consumer, in response to the node matching a lookup table in a lookup module for the node;
aggregating, by the processor, historical transactional data from the node associated with the consumer to form aggregated historical transactional data;
forming, by the processor, a transactional profile based on the aggregated transactional data and the aggregated historical transactional data;
calculating, by the processor, a characteristic of the consumer based upon the transactional profile;
determining, by the processor, a pattern of habits of the consumer based upon the transaction profile;
determining, by the processor, a targeted solicitation for a complementary good at the first merchant for the consumer based upon the pattern and the characteristic,
wherein the complementary good at the first merchant complements a product associated with the second SKU data from the second merchant, and wherein the targeted solicitation is viewable by the consumer on a graphical user interface, in response to obscured textual information on the graphical user interface being dynamically relocated and rescaled;

receiving, by the processor, the targeted solicitation sent to the consumer; and determining, by the processor, that the targeted solicitation is described in the aggregated transactional data.

11. The system of claim 10, wherein the aggregated transactional data also comprises at least one of kind code data or service code data.

12. The system of claim 10, wherein the first merchant and the second merchant are not affiliated with each other.

13. The system of claim 10, wherein the calculating comprises
determining whether the complementary good may be desired by the consumer.

14. The system of claim 10, wherein the calculating comprises identifying a competitive good relative to the aggregated transactional data.

15. The system of claim 10, further comprising sending, by the processor, the targeted solicitation for the complementary good to the consumer.

16. The system of claim 10, further comprising identifying that a good described in the aggregated transactional data is an upsell good.

17. The system of claim 10, wherein the targeted solicitation sent to the consumer contains an upsell.

18. An article of manufacture including a non-transitory computer readable storage medium having instructions stored thereon that, in response to execution by a processor comprising a non-transitory memory communicating with the processor, cause the processor to perform operations comprising:

receiving, by the processor, a first transaction identifier associated with a first transaction of a consumer, wherein the first transaction is at a first merchant;

providing, by the processor and to the first merchant, the first transaction identifier;

receiving, by the processor and from the first merchant, first stock keeping unit (SKU) data associated with the first transaction identifier;

matching, by the processor, the first SKU data to corresponding first transactional data associated with the first transaction;

receiving, by the processor, a second transaction identifier associated with a second transaction of the consumer, wherein the second transaction is at a second merchant;

providing, by the processor and to the second merchant, the second transaction identifier;

receiving, by the processor and from the second merchant, second SKU data associated with the second transaction identifier;

matching, by the processor, the second SKU data to corresponding second transactional data associated with the second transaction;

aggregating, by the processor, the first transactional data and the second transactional data associated with the consumer to form aggregated transactional data comprising the first SKU data, the first transactional data, the second SKU data, and the second transactional data;

confirming, by the processor, that a node is associated with the consumer, in response to the node matching a lookup table in a lookup module for the node;

aggregating, by the processor, historical transactional data from the node associated with the consumer to form aggregated historical transactional data;

forming, by the processor, a transactional profile based on the aggregated transactional data and the aggregated historical transactional data;

calculating, by the processor, a characteristic of the consumer based upon the transactional profile;

determining, by the processor, a pattern of habits of the consumer based upon the transaction profile;

determining, by the processor, a targeted solicitation for a complementary good at the first merchant for the consumer based upon the pattern and the characteristic, wherein the complementary good at the first merchant complements a product associated with the second SKU data from the second merchant, and wherein the targeted solicitation is viewable by the consumer on a graphical user interface, in response to obscured textual information on the graphical user interface being dynamically relocated and rescaled;

receiving, by the processor, the targeted solicitation sent to the consumer; and determining, by the processor, that the targeted solicitation is described in the aggregated transactional data.

* * * * *